United States Patent [19]

Ogasahara et al.

[11] Patent Number: 5,264,236
[45] Date of Patent: Nov. 23, 1993

[54] METHOD FOR PRODUCTION OF HOP EXTRACTS AND HOP EXTRACTS OBTAINED THEREBY

[75] Inventors: Johji Ogasahara, Osaka; Miyoko Ono, Takatuki; Kazuhiro Hamatani, Osaka; Masakazu Takahashi, Hyogo, all of Japan

[73] Assignees: Sumitomo Seika Chemicals Co., Hyogo; Suntory Ltd., Osaka, both of Japan

[21] Appl. No.: 775,541

[22] Filed: Oct. 15, 1991

[30] Foreign Application Priority Data

Nov. 6, 1990 [JP] Japan ................................. 2-300376

[51] Int. Cl.$^5$ ................................................ C12C 3/00
[52] U.S. Cl. ..................................... 426/600; 568/366
[58] Field of Search ......................... 426/600; 568/366

[56] References Cited

U.S. PATENT DOCUMENTS

| 2,187,755 | 9/1987 | Todd ...................... 426/600 |
| 4,104,409 | 8/1978 | Vitzthum et al. . |
| 4,212,895 | 7/1980 | Laws et al. . |
| 4,218,491 | 8/1980 | Laws ...................... 426/600 |
| 4,278,012 | 7/1981 | Wheldon ............... 426/600 |
| 4,282,259 | 8/1981 | Wheldon et al. . |
| 4,298,626 | 11/1981 | Laws ...................... 426/600 |
| 4,344,978 | 8/1982 | Sharpe et al. . |
| 4,507,329 | 3/1985 | Grant ...................... 426/600 |
| 4,511,508 | 4/1985 | Vollbrecht et al. . |
| 4,632,837 | 12/1986 | Schütz et al. . |
| 4,640,841 | 2/1987 | Forster .................. 426/600 |
| 4,666,731 | 5/1987 | Todd ...................... 426/600 |
| 4,828,867 | 5/1989 | Hallberg ............... 426/600 |
| 4,842,878 | 6/1989 | Forster et al. . |

FOREIGN PATENT DOCUMENTS

| 0020086 | 12/1980 | European Pat. Off. ............ 426/600 |
| 0061877 | 10/1982 | European Pat. Off. ............ 426/600 |
| 0173479 | 3/1986 | European Pat. Off. ............ 426/600 |
| 3346776 | 7/1985 | Fed. Rep. of Germany ...... 426/600 |
| 44364 | 12/1973 | Japan . |
| 1575827 | 10/1980 | United Kingdom . |

*Primary Examiner*—Carolyn Paden
*Attorney, Agent, or Firm*—Birch, Stewart, Kolasch & Birch

[57] ABSTRACT

The present invention is directed to a method for producing hop extracts containing small amounts of resin deterioration products, comprising extracting the hop extracts from dry hops using recycled carbon dioxide wherein said carbon dioxide is in a dry subcritical or supercritical condition, and to hop extracts obtained thereby. The hop extracts thus obtained are very useful in the production of high quality beer having a sharp and refreshing taste.

6 Claims, 1 Drawing Sheet

METHOD FOR PRODUCTION OF HOP EXTRACTS AND HOP EXTRACTS OBTAINED THEREBY

FIELD OF THE INVENTION

The present invention relates to a method for production of hop extracts, more specifically to a method for producing hop extracts which contain reduced amounts of deteriorated resin products using dry carbon dioxide in a subcritical or supercritical conditions as extracting agent, and to the hop extracts obtained thereby.

BACKGROUND OF THE INVENTION

Hops, one of the major raw materials for beer, are used to give a characteristic aroma and a refreshing bitter taste to beer. When hops are boiled along with the wort prior to the fermentation process, essential oils which provide the aroma and bitter taste components which provide the refreshing bitter taste are extracted, and subsequently thermal isomerization takes place, whereby the wort comes to have the characteristic hop flavour. In the method described above, the bitter taste components, e.g., α-acids (Structural Formula 1), a major component of the soft resins of hops, isomerizes to water-soluble bitter taste components, mainly iso-α-acids (Structural Formula 3), during boiling the wort to give a refreshing sharp bitter taste to beer. As for β-acids (Structural Formula 2), another major component of the soft resins of hops, only a very small amount is extracted and transferred into the wort because its water-solubility is extremely low.

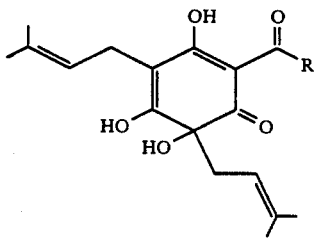

(1) α-acids

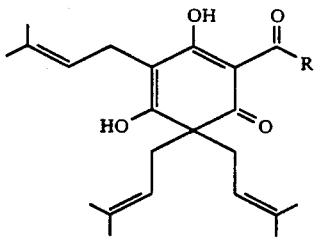

(2) β-acids

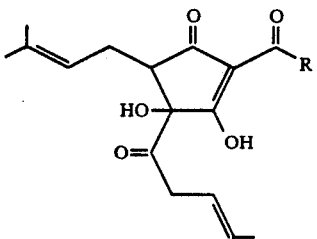

(3) iso-α-acids

-continued

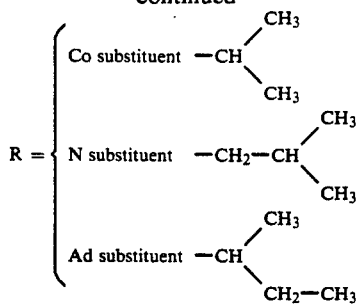

However, hops must be used after storage in the dried form after harvesting and in the form of whole hops, hop powder, hop pellets and so on, since it is difficult to harvest hops all through the year. Moreover, hops are very susceptible to oxidation; when α-acids or β-acids, major components of the soft resins of hops, are oxidized, the resulting deteriorated resin products such as humulinic acids (Structural Formula 4), tricyclodehydroisohumulones (Structural Formula 5) and hulupones (Structural Formula 6) are extracted and transfer into the wort, and most of them transfer into beer because they are highly soluble in water.

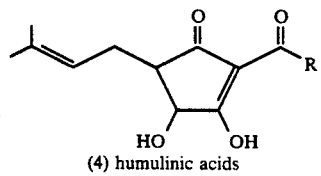

(4) humulinic acids

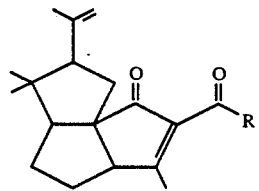

(5) tricyclodehydroisohumulones

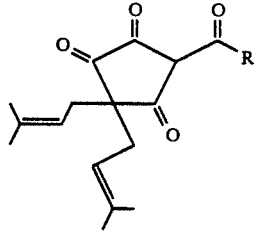

(6) hulupones

When these deteriorated resin products exist in beer, they deteriorate the quality of the beer. The degree of production of these deteriorated resin products depends on conditions of the hop drying stage, processing stage, storage and other factors. With respect to the production mechanism and the effects on the quality of beer, the present inventors have already investigated in detail (M. Ono, Y. Kakudo, R. Yamamoto, K. Nagami and J. Kumada, J. Amer. Soc. Brew. Chem., vol. 45, pp. 61-69, 1987).

As stated above, hops are susceptible to oxidation, and oxidized hops deteriorate the quality of beer; therefore, degassing and strict temperature control are necessary during the drying and processing stages. For storage, a warehouse equipped with large refrigerating equipment is necessary, which also requires strict control.

On the other hand, there is a method in which only desired components are extracted from hops with organic solvents and used as the hop extracts in place of hops themselves. In this case, the desired components are stored in the form of concentrated hop extracts; therefore, the hop extracts offer the advantages of easy handling and storage space reduction. However, the hop extracts using organic solvents have various problems as follows.

1) Hard resin, tannin, fats, wax and pigments such as chlorophyll are extracted along with the desired components for beer flavour and the hop extracts have poor colour. Beer prepared using the extracts may lack refreshment and excess miscellaneous tastes.

2) It is feared that harmful organic solvents may remain in the hop extracts.

3) Upon distilling off the organic solvent, the flavour components escape, and deteriorated resin products increase due to heating.

On the other hand, as a method of efficient extraction of desired components from natural products without the problem of residual organic solvent, supercritical fluid extraction using carbon dioxide (West German Patent Publication No. 2127618) is known. Examples of published application of this method applied to hops include Japanese Patent Examined Publication Nos. 44864/1973 and 41375/1989 and U.S. Pat. Nos. 4,104,409 and 4,344,978.

However, none of these attempts based on the prior art method aims at producing hop extracts containing the reduced amounts of deteriorated resin products; there is no disclosure other than a supercritical fluid extraction method using carbon dioxide and a production method for hop extracts having a low tannin content.

Based on the method described above, the present inventors attempted to use carbon dioxide in a subcritical or supercritical condition to produce hop extracts which contain the reduced amounts of deteriorated resin products.

It was found, however, that if carbon dioxide is recycled and reused after extraction and separation of hop extracts, the desired object cannot be accomplished because of simultaneous extraction of a part of the deteriorated resin products. On the other hand, if carbon dioxide is not recycled but vented into the atmosphere after separation of hop extracts, the amount of simultaneously extracted deteriorated resin products can be reduced, but a huge amount of fresh carbon dioxide is necessary, which is too expensive for the production of hop extracts. In addition, ventilation carbon dioxide into the atmosphere involves a critical problem of escape of the desired flavour components characteristic to hops.

Although some other methods are available in which the desired components, e.g., soft resins and essential oils, are selectively separated under finely set separating conditions or in which the deteriorated resin products are selectively separated and removed, these methods are undesirable from the economic and operational viewpoints because the equipment is complex and process control is troublesome.

As stated above, by the prior art method, it is difficult to economically and efficiently produce hop extracts containing large amounts of desired components and reduced amounts of deteriorated resin products without a loss of flavour components.

SUMMARY OF THE INVENTION

It is an object of the present invention to provide a method for producing hop extracts which contain the reduced amounts of deteriorated resin products using dry carbon dioxide in a subcritical or supercritical condition as extracting agent, and the hop extracts obtained thereby.

The inventors found that when extraction is conducted using carbon dioxide in a subcritical or supercritical condition, a correlation exists between the water content in carbon dioxide and the amount of deteriorated resin products extracted, and that the water content affects the solubility of the deteriorated resin products in carbon dioxide.

In other words, with the recognition of the action of the water in the carbon dioxide to increase the solubility of some deteriorated resin products in carbon dioxide, the inventors found that extraction of deteriorated resin products can be suppressed by reducing the water content in carbon dioxide, and thus developed the present invention.

Here, the water in carbon dioxide is mostly the water which has transferred therein upon contact thereof with raw material hops, since carbon dioxide itself contains only a trace amount of water. Therefore, when hop extracts are extracted using recycled and reused carbon dioxide, almost all water in the carbon dioxide originates from the water in hops.

Generally, hops are used as raw material hops, which contain 5 to 20% water. If the water content is to be reduced, the object can easily be accomplished by increasing the degree of dryness of the raw material hops. However, this approach is undesirable for a number of reasons, for example, drying above the normal degree of dryness is not only expensive but also leads to a loss of flavour components, results in an increase in deteriorated resin products due to heating, and causes a tendency toward absorption to hops during storage.

Therefore, for reducing the water content in carbon dioxide, it is simpler and more economical to use the method in which recycled and reused carbon dioxide is brought into contact with a desiccant and to remove the water therein which has transferred from the raw material hops.

The present invention was developed on the basis of these findings. Essentially, the invention relates to:

(1) a method for producing hop extracts, which contain reduced amounts of deteriorated resin products, by extracting hops using recycled and reused carbon dioxide, wherein said carbon dioxide is in a subcritical or supercritical condition, and (2) the hop extracts which contain the reduced amounts of deteriorated resin products obtained by the method for production described in (1) above.

DETAILED DESCRIPTION OF THE INVENTION

Figure 1:
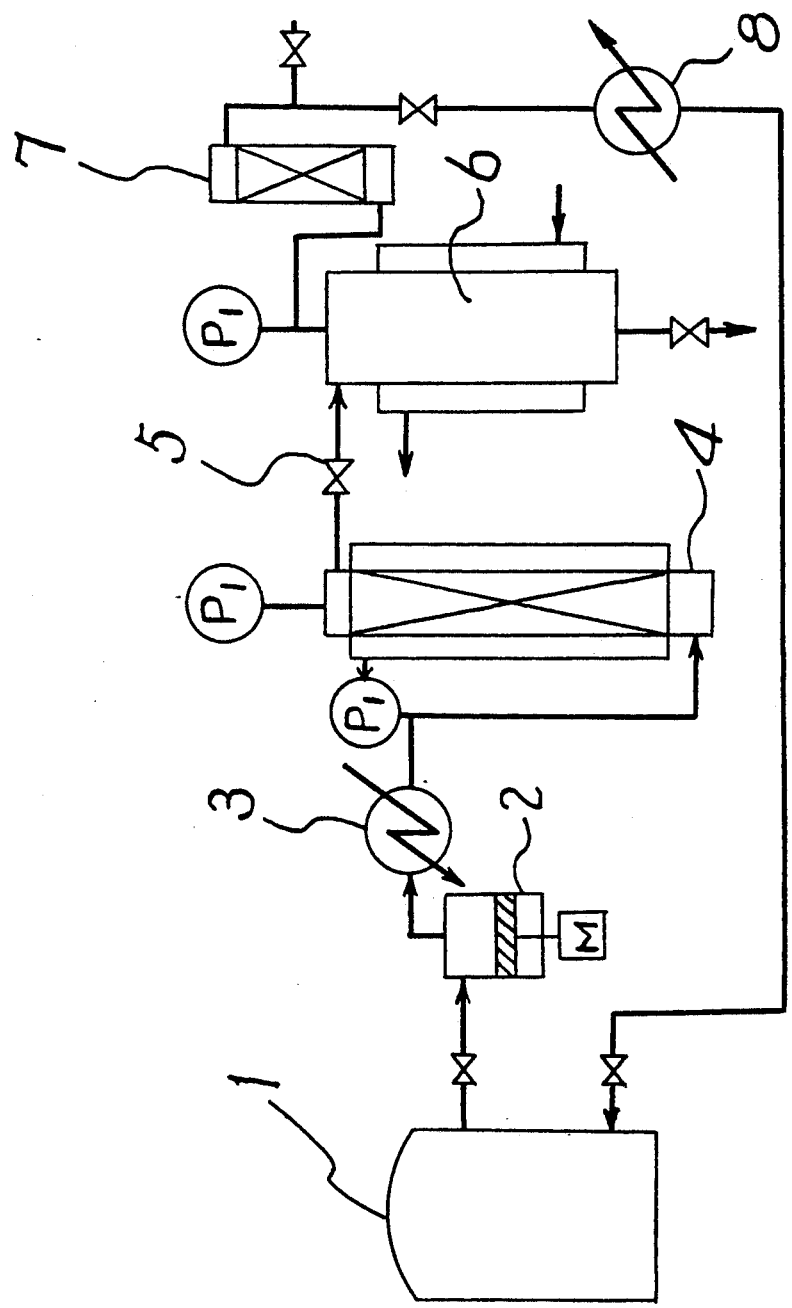
FIG. 1 shows a flow sheet of a mode of embodiment of the present invention, wherein the numerical symbols 1 through 8 respectively denote a carbon dioxide holder (1), a compressor (2), a heat exchanger (3), an extraction chamber (4), a pressure-reducing valve (5), a separation chamber (6), a drying chamber (7), and a condenser (8).

As stated above, the water content in hops is 5 to 20%; extracting hops using dry carbon dioxide result in extraction of water along with the extracts. In this case, the water content in carbon dioxide can be appropriately adjusted by varying the extraction conditions, such as the amount of carbon dioxide recycled, and the extraction temperature, and is normally 1000 to 5000 ppm.

Carbon dioxide after being used for the extraction and separation process is brought into contact with a desiccant to remove water therefrom after separating the hop extracts. Since the amount of deteriorated resin products extracted simultaneously with the hop extracts from hops decreases as the water content in carbon dioxide decreases, it is necessary to minimize the water content. In this case, high quality hop extracts containing substantially no deteriorated resin products or containing significantly reduced amounts of deteriorated resin products can be obtained by carrying out the extraction with carbon dioxide in a subcritical or supercritical condition having a water content of not more than 1000 ppm, preferably not more than 500 ppm after contact with the desiccant. When the water content exceeds 1000 ppm, no effect on reducing the amount of deteriorated resin products is obtained, and the results obtained are substantially the same as those obtained using recycled and reused carbon dioxide without contact with a desiccant.

Although a variety of forms of hops can be used as a raw material for the present invention, including whole hops, hop powder, pelletized hops and milling products thereof, all dried by an ordinary drying method, it is advantageous from the viewpoint of extraction efficiency to use hops in a milled form.

However, since not only the form of hops but also the variety, quality and other features of raw material hops significantly affect the quality of the obtained hop extracts and in turn the quality of beer, the raw material hops must be selected according to the purpose in advance.

The subcritical or supercritical carbon dioxide used as extracting agent in the present invention is non-flammable, harmless, cheap, and easy to handle, with a critical temperature of 31.3° C. and a critical pressure of 72.9 atm. In addition, a supercritical fluid has a density close to that of liquid and a high diffusion coefficient, close to that of a gas, which characteristics give the supercritical fluid the capability of quickly extracting large amounts of various compounds with high yield. Moreover, supercritical carbon dioxide is easily separated from the extracts by slightly changing the pressure or temperature, and even offers a bacteriostatic or bactericidal effect, as an advantageous characteristic of carbon dioxide. It is thus harmless to humans, and sanitary. For these reasons, it is especially suitable for use in foods and pharmaceuticals, and is preferably used to obtain hop extracts, the desired product of the present invention.

When dry subcritical or supercritical carbon dioxide is used as extracting agent, the carbon dioxide pressure and temperature in the extraction chamber must be kept normally at 60 to 400 kg/cm$^2$, preferably at 100 to 350 kg/cm$^2$ and normally at 25° to 100° C., preferably at 30° to 70° C., respectively, during extraction. This is because pressures and temperatures exceeding the respective upper limits result in increased equipment cost, which is undesirable from the economic viewpoint, and pressures and temperatures below the respective lower limits hamper efficient extraction of hop extracts.

As for separating conditions in the separation chamber, good results are obtained when the pressure and temperature are kept at 20 to 150 kg/cm$^2$, preferably 30 to 100 kg/cm$^2$, and 25° to 100° C., preferably 30° to 70° C., respectively. It is also possible to selectively obtain a particular component free of deteriorated resin products by varying separating conditions such as separation pressure and separation temperature on a time basis or by carrying out separation in a number of stages.

It is preferable that contact of desiccant and carbon dioxide is achieved by flowing carbon dioxide through a desiccant-packed chamber prior to re-introducing carbon dioxide into the extraction chamber after separating the hop extracts because this method is efficient and has little influence on the hop extracts.

In the present invention, various commonly known desiccants can be used. Examples of such desiccants include silica gel, calcium chloride, calcium sulfate, magnesium oxide, aluminum oxide, water-absorbing resins (e.g., Aquakeep, produced by Sumitomo Seika Chemicals Co., Ltd.) and porous materials (e.g., molecular sieves), with preference given to silica gel, calcium chloride, molecular sieves, etc. because they are easily available, economic and desirable from the viewpoint of food hygiene.

When hops are extracted by the method of the present invention, the obtained hop extracts which contain the reduced amounts of deteriorated resin products. Here, "the reduced amounts of deteriorated resin products" includes the case where substantially no deteriorated resin product is contained. When ordinary hops are used as a raw material, the obtained effect is such that substantially no deteriorated resin products are contained, as described in Examples below. Also, even when using deteriorated hop pellets containing an intentionally increased amount of deteriorated resin products, the amount of deteriorated resin products extracted along with the hop extracts is very small.

A mode of embodiment of the present invention in which dry carbon dioxide in a subcritical or supercritical condition is used as the extracting agent is hereinafter described by means of the flow sheet shown in FIG. 1.

FIG. 1 illustrates a case where a drying chamber 7 is arranged after a separation chamber 6.

In FIG. 1, carbon dioxide, compressed to a given pressure by means of a compressor 2, is passed from a carbon dioxide holder 1 through a heat exchanger 3 to heat to a given extraction temperature and then introduced into an extraction chamber 4 while maintaining a subcritical or supercritical condition. The extraction chamber 4 has been charged with raw material hops.

After extraction with the subcritical or supercritical carbon dioxide, the extract-containing carbon dioxide is passed through a pressure-reducing valve 5 to reduce its pressure and then introduced into a separation chamber 6, where the extracts are separated from the carbon dioxide. After separating the extracts, the carbon dioxide is introduced into a drying chamber 7, where the water in the carbon dioxide is removed by the charged desiccant. The carbon dioxide thus dried is cooled and liquefied in a condenser 8 and recycled via a compressor 2. In this manner, the subcritical or supercritical carbon dioxide as extracting agent is dried to remove water to not more than 1000 ppm, and then recycled as dry carbon dioxide.

A method of the present invention characterized as above offers the following excellent effects.

(1) In the extraction of hops using subcritical or supercritical dry carbon dioxide as an extracting agent, it is possible to produce high quality hop extracts which contain reduced amounts of deteriorated resin products, (deteriorated resin products significantly affect the quality of beer) only by using dry carbon dioxide from which water has been removed by contact thereof with a desiccant.

(2) The use of carbon dioxide as extracting agent makes it possible to obtain safe and sanitary hop extracts free of residual organic solvent.

(3) The recycling and reuse of carbon dioxide permits obtainment of hop extracts maintaining the rich hop flavour at low cost.

The hop extracts thus obtained, which contain reduced amounts of deteriorated resin products, are very useful in the production of high quality beer having a sharp and refreshing taste and flavour.

EXAMPLES

The present invention is hereinafter described in more detail by means of the following working examples, comparative examples and test example, but the invention is never limited by these examples.

EXAMPLE 1

Using the extraction chamber 4 having an inside capacity of 2 l illustrated in FIG. 1, hops were extracted.

Specifically, 702 g of milled hop pellets (containing about 10% water), which are commonly used for producing beer, was charged in the extraction chamber and subjected to extraction and separation of the hop extracts using supercritical carbon dioxide at an extraction chamber pressure of 230 kg/cm$^2$, an extraction chamber temperature of 40° C., a separation chamber pressure of 50 kg/cm$^2$ and a separation chamber temperature of 40° C. The carbon dioxide which exited the separation chamber was passed through a drying chamber packed with 500 g of silica gel to thereby remove water, after which it was recycled.

After passage through the drying chamber, the carbon dioxide had a water content of 150 ppm.

After circulating carbon dioxide for about 5 hours, 102.8 g of light green hop extracts were obtained in the separation chamber. The residual hop pellets weighed 569.2 g.

The starting hop pellets and the hop extracts obtained were analyzed for major components and deteriorated resin products by liquid chromatography. The results are shown in Table 1.

The analysis by liquid chromatography was conducted by the method of Ono et al. (M. Ono, Y. Kakudo, R. Yamamoto, K. Nagami and J. Kumada, J. Amer. Soc. Brew. Chem., vol. 45, pp. 70-76, 1987). The unit amount of deteriorated resin products is expressed as the ratio of the peak area from the group of deteriorated resin products to the peak area from the internal standard substance.

No deteriorated resin product was detected in the hop extracts obtained.

In the production of beer, $\alpha$-acids in hops isomerize to iso-$\alpha$-acids during boiling of the wort to give a refreshing bitter taste to beer as stated above; therefore, the amount of hops used is determined from the $\alpha$-acids content in the hops, in most cases. Since almost all deteriorated resin products in hops transfer into beer, the amount of deteriorated resin products produced per gram of $\alpha$-acids was calculated. The results are also shown in Table 1. The bitter taste quality of beer improves as this amount of deteriorated resin products produced per gram of $\alpha$-acids decreases.

EXAMPLE 2

Hops were extracted and separated under the same conditions as in Example 1 except that the amount of milled hop pellets was 669 g and the drying chamber was packed with 500 g of calcium chloride in place of silica gel. After passage through the drying chamber, the carbon dioxide had a water content of 278 ppm.

After circulating carbon dioxide for about 5 hours, 93.7 g of light green hop extracts were obtained in the separation chamber. The residual hop pellets weighed 532.6 g.

The starting hop pellets used and the hop extracts obtained were analyzed by liquid chromatography in the same manner as in Example 1. The results are shown in Table 1. No deteriorated resin product was detected in the hop extracts.

EXAMPLE 3

Using supercritical carbon dioxide, hops were extracted and separated from 680 g of milled hop pellets in the same manner as in Example 1 except that the extraction chamber pressure was 150 kg/cm$^2$, the extraction chamber temperature was 50° C., the separation chamber pressure was 45 kg/cm$^2$ and the separation chamber temperature was 40° C. The carbon dioxide which exited the separation chamber was passed through the drying chamber packed with 500 g of silica gel to thereby remove water, after which it was recycled.

After passage through the drying chamber, the carbon dioxide had a water content of 125 ppm. After circulating carbon dioxide for about 5 hours, 85.2 g of light green hop extracts were obtained in the separation chamber. The residual hop pellets weighed 559.8 g. The starting hop pellets and the hop extracts obtained were analyzed by liquid chromatography in the same manner as in Example 1. The results are shown in Table 1. No deteriorated resin product was detected in the hop extracts.

EXAMPLE 4

Hops were extracted and separated under the same conditions as in Example 1 except that the amount of silica gel packed in the drying chamber was changed to 250 g. The recycled carbon dioxide had a water content of 450 ppm. 82.9 g of light green hop extracts were obtained in the separation chamber. The residual hop pellets weighed 521.7 g. The starting hop pellets and the hop extracts obtained were analyzed by liquid chromatography. The results are shown in Table 1. No deteriorated resin product was detected in the hop extracts obtained.

EXAMPLE 5

Hops were extracted and separated under the same conditions as in Example 2 except that the amount of calcium chloride packed in the drying chamber was changed to 200 g. The recycled carbon dioxide had a water content of 780 ppm. 84.0 g of light green hop extracts were obtained in the separation chamber. The residual hop pellets weighed 540.3 g. The starting hop pellets and the hop extracts obtained were analyzed by liquid chromatography. The results are shown in Table 1. As a result, only 0.36% of the deteriorated resin products present in the starting hop pellets were extracted along with the hop extracts.

COMPARATIVE EXAMPLE 1

Hops were extracted and separated under the same conditions as in Example 1 except that the amount of milled hop pellets was 683 g and nothing was packed in the drying chamber. The recycled carbon dioxide had a water content of 1250 ppm. After circulating carbon dioxide for about 5 hours, 88.3 g of light green hop extracts were obtained in the separation chamber. The residual hop pellets weighed 580.3 g.

The starting hop pellets and the hop extracts obtained were analyzed by liquid chromatography in the same manner as in Example 1. The results are shown in Table 1. 36.9% of the deteriorated resin products present in the starting hop pellets was extracted along with the hop extracts.

EXAMPLE 6

About 1 kg of the same hop pellets as used in Example 1 were kept standing in thermostat at 50° C. for 18 hours to increase amount of deteriorated resin products in the hop pellets (hereinafter referred to as deteriorated hop pellets). Hops were extracted and separated under the same conditions as in Example 1 except that 403 g of a milling product of the deteriorated hop pellets thus prepared was charged in the extraction chamber and supercritical carbon dioxide was circulated for 2 hours.

The carbon dioxide which exited the separation chamber was passed through the drying chamber packed with 500 g of silica gel to thereby remove water, after which it was recycled. After passage through the drying chamber, the carbon dioxide had a water content of 165 ppm.

After circulating carbon dioxide for about 2 hours, 21.3 g of light green hop extracts were obtained in the separation chamber. The residual hop pellets weighed 352.7 g.

The starting deteriorated hop pellets and the hop extracts obtained were analyzed by liquid chromatography in the same manner as in Example 1. The results are shown in Table 1. Only 3.7% of the deteriorated resin products present in the deteriorated hop pellets was extracted along with the hop extracts.

COMPARATIVE EXAMPLE 2

Using supercritical carbon dioxide, hops were extracted and separated under the same conditions as in Example 6 except that 398 g of the same milled hop pellets as in Example 6 was charged in the extraction chamber, and nothing was packed in the drying chamber. The recycled carbon dioxide had a water content of 1650 ppm.

After circulating carbon dioxide for about 2 hours, 20.8 g of light green hop extracts were obtained in the separation chamber. The residual hop pellets weighed 363.7 g.

The starting deteriorated hop pellets and the hop extracts obtained were analyzed by liquid chromatography in the same manner as in Example 1. As shown in Table 1, 43.1% of the deteriorated resin products present in the deteriorated hop pellets was extracted.

TABLE 1 (1)

| | Major components in hops | | | | | Major components in hop extracts | | | | |
|---|---|---|---|---|---|---|---|---|---|---|
| No. | Total weight (g) | α-acids (g) | β-acids (g) | Resin deterioration (unit) | Resin deterioration per α-acids (unit) | Total weight (g) | α-acids (g) | β-acids (g) | Resin deterioration (unit) | Resin deterioration per α-acids (unit) |
| Ex 1 | 702 | 38.9 | 39.5 | $3.70 \times 10^6$ | $9.5 \times 10^4$ | 102.8 | 38.7 | 39.4 | ND | — |
| Ex 2 | 669 | 37.1 | 37.7 | $3.53 \times 10^6$ | $9.5 \times 10^4$ | 93.7 | 37.0 | 37.7 | ND | — |
| Ex 3 | 680 | 37.7 | 38.3 | $3.58 \times 10^6$ | $9.5 \times 10^4$ | 85.2 | 37.5 | 38.2 | ND | — |
| Ex 4 | 633 | 35.1 | 35.6 | $3.34 \times 10^6$ | $9.5 \times 10^4$ | 82.9 | 35.0 | 35.5 | ND | — |
| Ex 5 | 656 | 36.3 | 36.9 | $3.46 \times 10^6$ | $9.5 \times 10^4$ | 84.0 | 36.1 | 36.7 | $1.23 \times 10^4$ | $3.4 \times 10^2$ |
| Ex 6 | 403 | 6.1 | 5.8 | $2.93 \times 10^6$ | $48.0 \times 10^4$ | 21.3 | 6.1 | 5.8 | $1.08 \times 10^5$ | $1.8 \times 10^4$ |
| Com. Ex 1 | 683 | 37.8 | 38.5 | $3.60 \times 10^6$ | $9.5 \times 10^4$ | 88.3 | 37.8 | 38.5 | $1.33 \times 10^6$ | $3.5 \times 10^4$ |
| Com. Ex 2 | 398 | 6.0 | 5.7 | $2.90 \times 10^6$ | $48.3 \times 10^4$ | 20.8 | 6.0 | 5.7 | $1.25 \times 10^6$ | $20.8 \times 10^4$ |

ND: No Detection

TABLE 1 (2)

| | Yields of each component | | |
|---|---|---|---|
| No. | α-acids (%) | β-acids (%) | Resin deterioration (%) |
| Ex 1 | 99.5 | 99.7 | — |
| Ex 2 | 99.7 | 100 | — |
| Ex 3 | 99.5 | 99.7 | — |
| Ex 4 | 99.7 | 99.7 | — |
| Ex 5 | 99.4 | 99.5 | 0.36 |
| Ex 6 | 100 | 100 | 3.7 |
| Com. Ex 1 | 100 | 100 | 36.9 |
| Com. Ex 2 | 100 | 100 | 43.1 |

TEST EXAMPLE

The hop extracts obtained in Examples 4 and 6 and Comparative Examples 1 and 2 were used to produce beer. The beer thus obtained were subjected to sensory evaluation by six well trained panelists with respect to oxidized hop odor, intensity of bitter taste, sharpness of bitter taste, refreshment and personal favor. The results are shown in Table 2. The amount of hop extracts used for beer was adjusted so that the beer products had the same bitter taste value.

TABLE 2

| Sensory evaluation | Example 4 | Example 6 | Comparative Example 1 | Comparative Example 2 |
|---|---|---|---|---|
| Oxidized hop odor | nothing | nothing | slightly | strong |
| Intensity of bitter | moderate | moderate | moderate | weak |
| Sharpness of bitter | good | good | a bit bad | bad |
| Refreshment | good | good | good | bad |
| Personal favor (favor/unfavor) | 4/2 | 6/0 | 2/4 | 0/6 |

What is claimed is:

1. A method for producing hop extracts which contain reduced amounts of deteriorated resin products, comprising extracting hops with dry, recycled carbon dioxide in a subcritical or supercritical condition to obtain wet carbon dioxide, and hop extracts containing reduced amounts of deteriorated resin products, drying said wet carbon dioxide by contacting with a desiccant, and reintroducing said dried carbon dioxide at subcritical or supercritical conditions into the extraction process.

2. The method according to claim 1, wherein the water content in said carbon dioxide is not more than 1000 ppm.

3. The method according to claim 1, wherein said carbon dioxide in a subcritical or supercritical condition is in the range of a pressure of 60 to 400 kg/cm$^2$ and a temperature of 25° to 100° C.

4. The method according to claim 1, wherein said desiccant is selected from the group consisting of silica gel, calcium chloride, calcium sulfate, magnesium oxide, aluminum oxide, water-absorbing resin and porous material.

5. Hop extracts which contain the reduced amounts of deteriorated resin products obtainable by the method of any one of claims 1, 2, 3, or 4.

6. A method for producing hop extracts containing reduced amounts of deteriorated resin products, comprising
 (a) extracting hops with dry, recycled carbon dioxide in a subcritical or supercritical condition to form a mixture of wet carbon dioxide and hop extracts;
 (b) separating said hops extracts from said wet carbon dioxide to obtain said hop extracts containing reduced amounts of deteriorated resin products;
 (c) drying said wet carbon dioxide by contacting with a desiccant to obtain dried carbon dioxide having a water content of not more than 1000 ppm; and
 (d) reintroducing said dried carbon dioxide at subcritical or supercritical conditions into said extracting of said hops (a).

* * * * *